May 13, 1969
H. ERNST
3,443,569
COMBINED CANE AND LEG REST DEVICE
Filed May 24, 1967
Sheet _1_ of 5
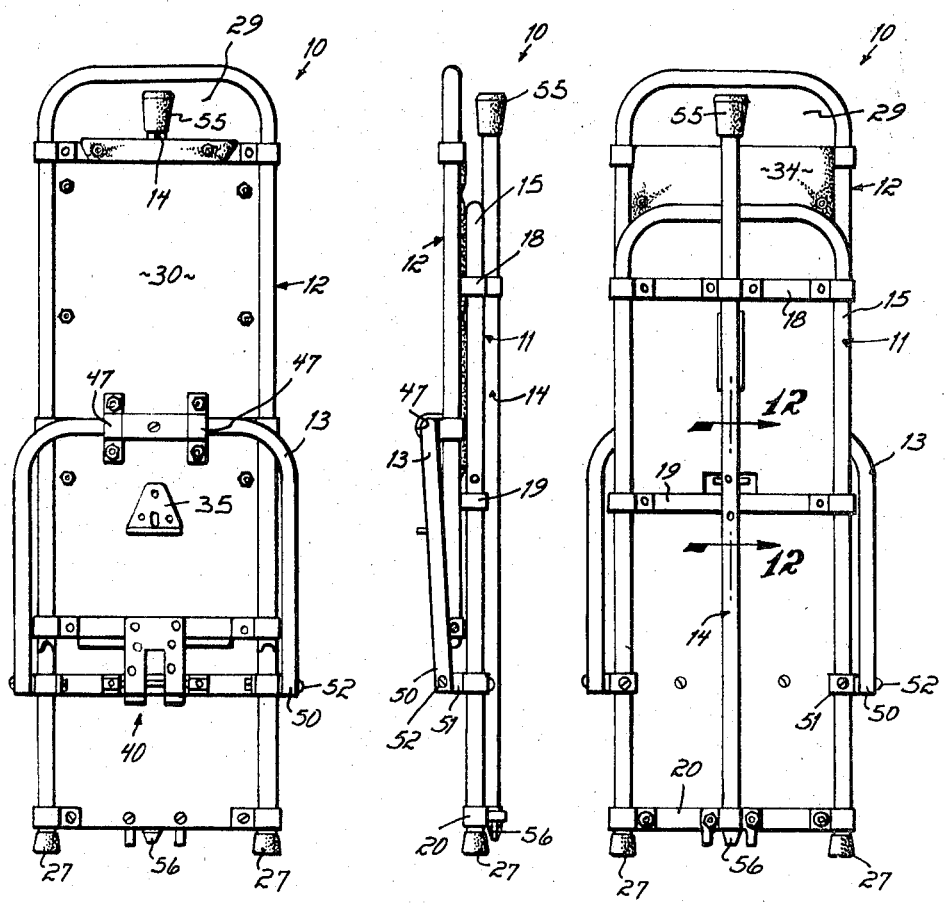
INVENTOR
Hans Ernst
BY
Wood, Herron & Evans
ATTORNEYS

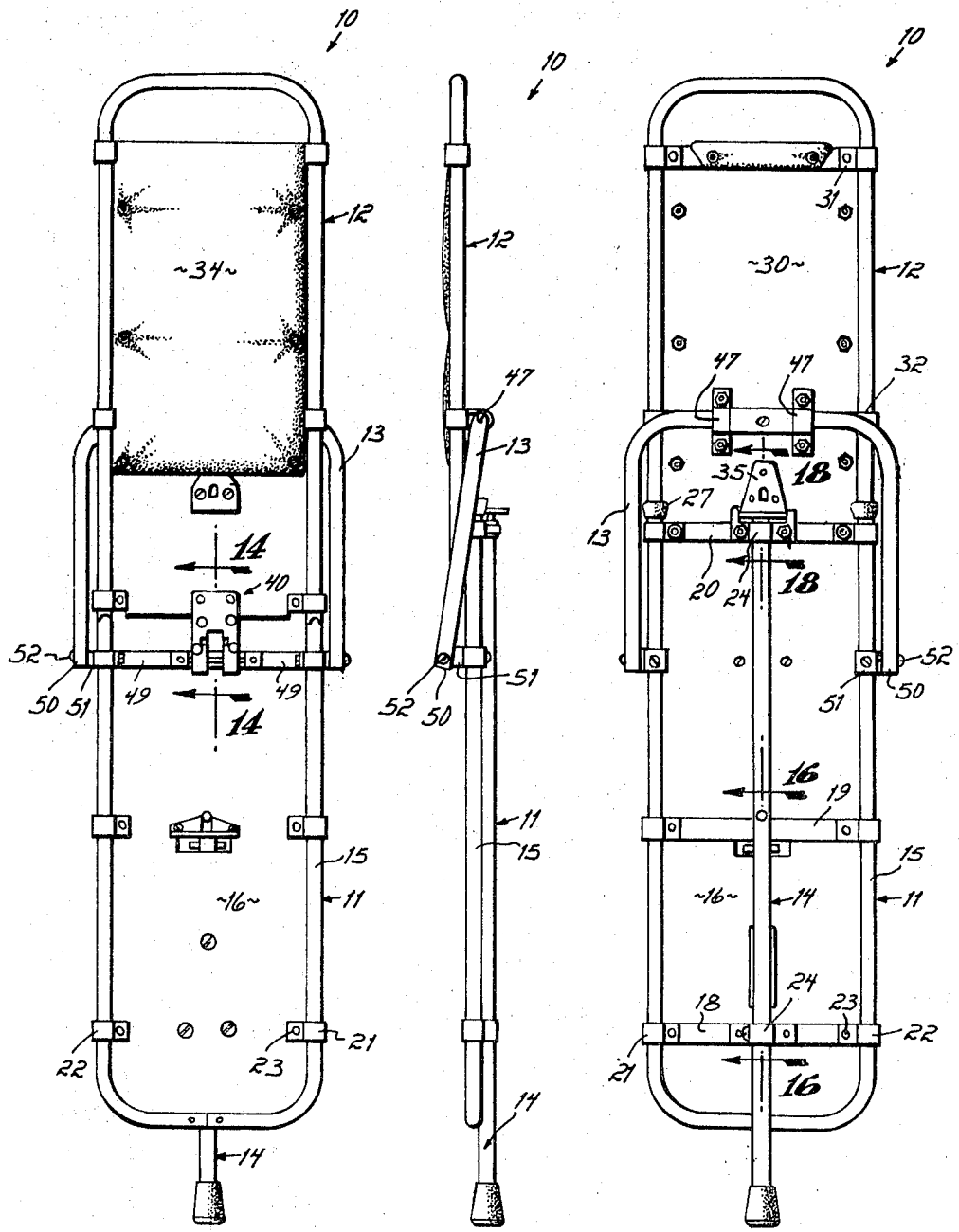

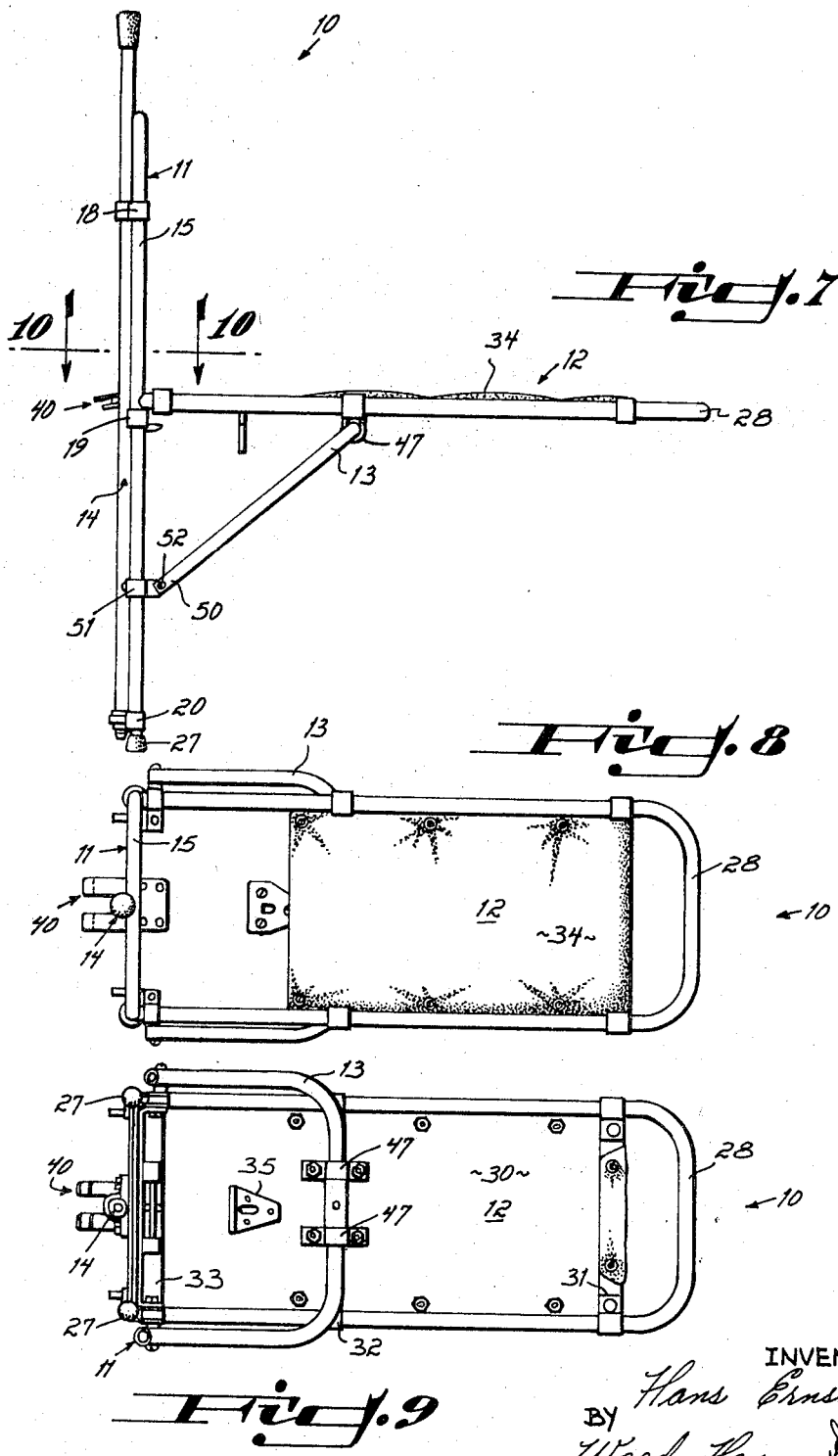

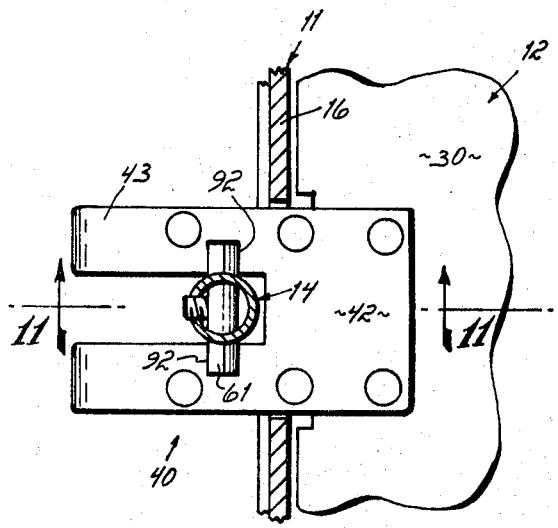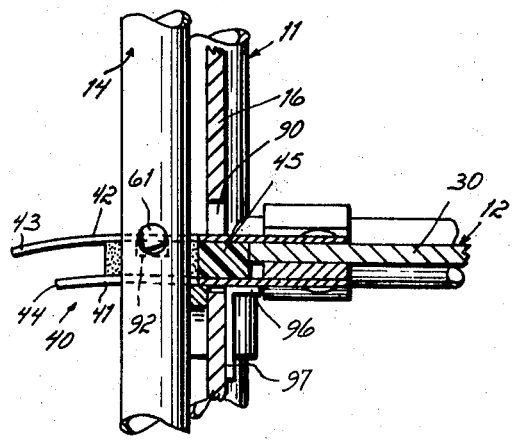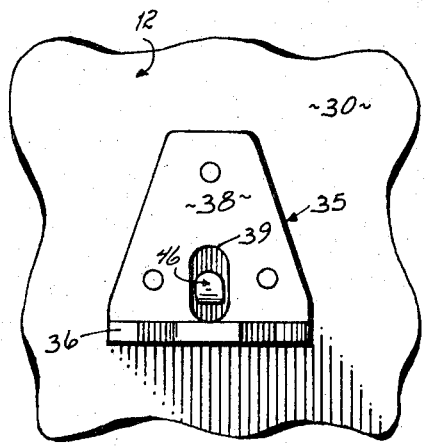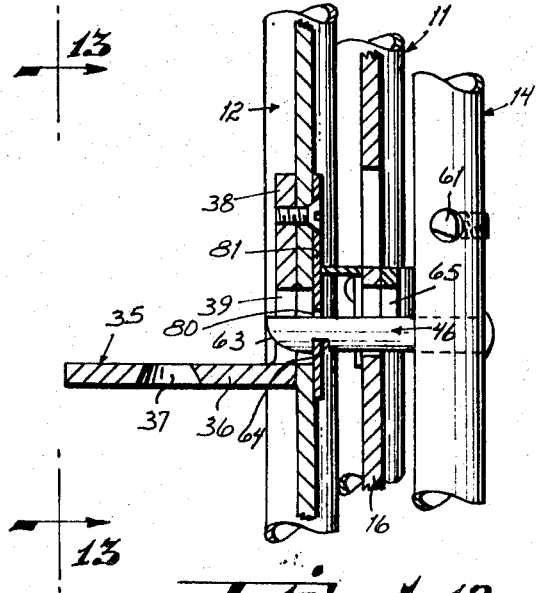

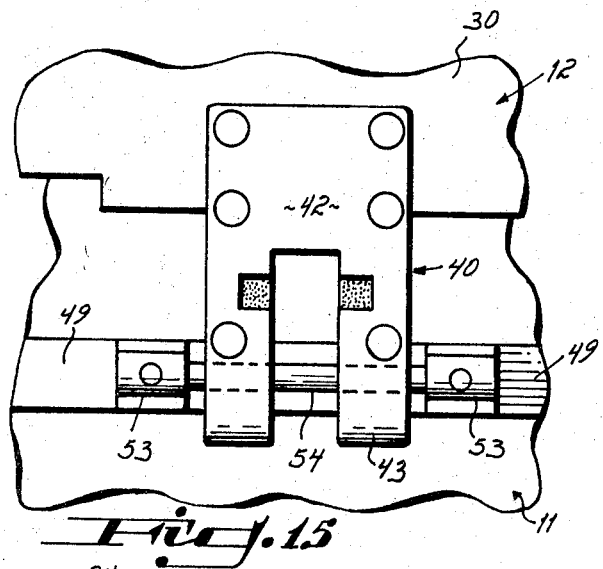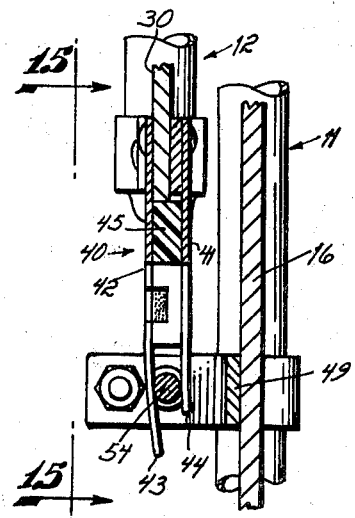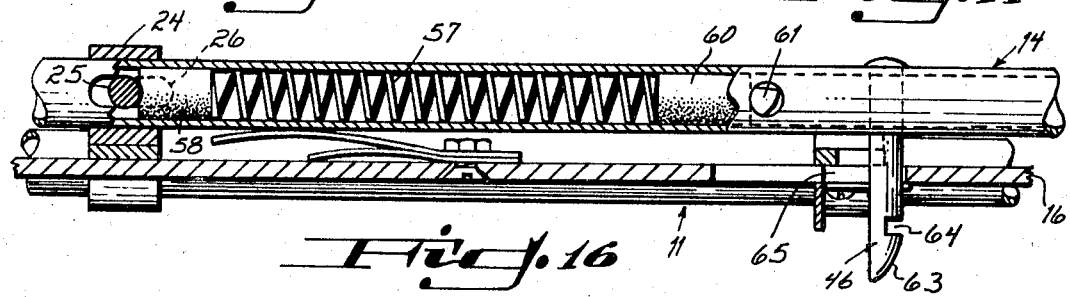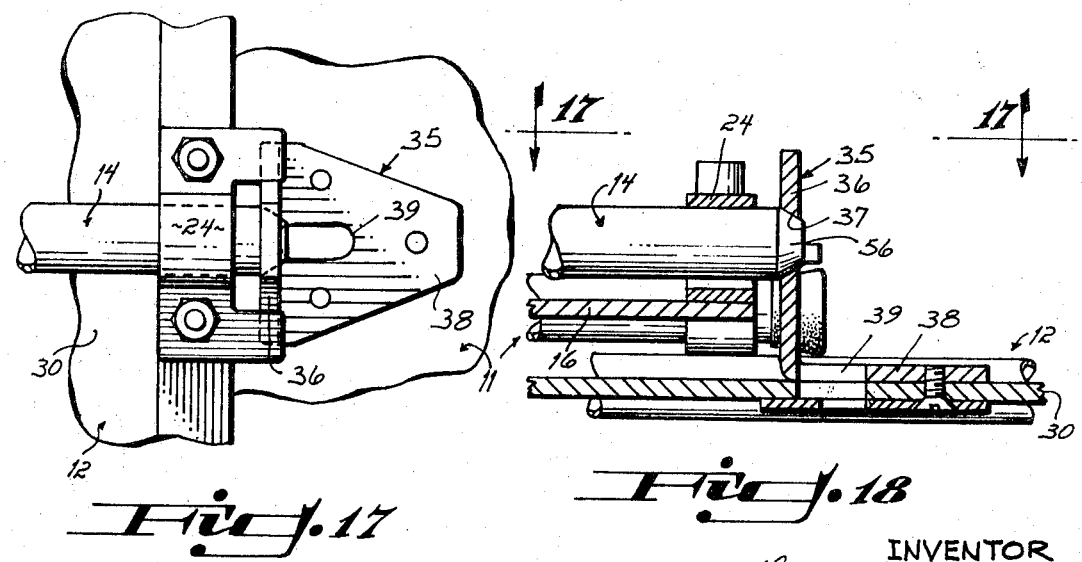

United States Patent Office 3,443,569
Patented May 13, 1969

3,443,569
COMBINED CANE AND LEG REST DEVICE
Hans Ernst, 1021 Eldorado Ave.,
Clearwater, Fla. 33515
Filed May 24, 1967, Ser. No. 640,934
Int. Cl. A45b *3/00;* A61h *3/02*
U.S. Cl. 135—47                                  10 Claims

ABSTRACT OF THE DISCLOSURE

A combined cane and leg rest device having three operative positions; a folded "carrying" position, an extended "cane" position, and a "footrest" position. The device includes two pivotally interconnected panel sections which are folded to overlap one another in the "carry" position, are extended parallel to one another in the "cane" position and are secured perpendicular to one another in the "rest" position. A single reciprocable rod functions both as a cane tip and as a releasable latch to hold the device in each of its positions.

Background of the invention

Many people, such as those suffering from cardiac conditions, circulatory problems, leg injuries, and the like, find it expedient to support one or both legs in an elevated position when sitting. Many such persons also utilize a cane as an aid to walking. The present invention is particularly directed to a single device which can be selectively utilized either as a cane or as a footrest to support one or both legs in an elevated position.

While in the past various devices have been proposed which function both as a cane and as a stool or rest, these devices have suffered from one or more defects overcome by the present device. One of the principal defects of these devices is that they are bulky and cannot be folded into a compact "package" for carrying or packing in a suitcase or the like. Other prior art convertible cane devices have also either had a tendency to be unreliable or have been cumbersome to set up, particularly for a person seated in a constricted place, for example in a restaurant booth or table.

Summary of the invention

The present invention is directed to a novel combined cane-leg rest unit having three operative or functional positions. In the first position, the unit functions as a conventional cane. In the second position, the unit functions as a leg rest and, in the third position, the various members of the unit are compactly folded upon themselves to form a relatively small "package" which can be readily carried like a briefcase, or can be packed in a small suitcase or the like.

More particularly, the present device comprises two rigid panel sections, each of which is pivotally joined to an interconnecting member. The device further includes an elongated rod extending beyond one of the panel members to form a conventional cane tip. This rod member is reciprocable and is effective, in cooperation with a plurality of latch elements, to selectively latch the unit in each of its three positions.

When the device is configurated in its "carry" position, the panels are folded so that they extend parallel to one another and largely overlap. A U-shaped handle formed by the frame of one of the panel sections provides a carrying grip. The unit is releasably locked in this position by the engagement of a detent finger carried on the cane rod with a latch plate carried by one of the panel sections.

The device is arranged in a "cane" position by pivoting one of the panel sections so that it forms in effect an extension of the other panel section with the cane rod extending below the lowermost extension with its tip disposed for engagement with the ground. The device is grasped by the same handle portion referred to above. The panel sections are releasably locked in this position by the engagement of the end of the cane rod opposite the cane tip with an aperture in a bracket carried by one of the panel sections.

The unit is converted to its third, or "leg rest" position by pivoting one panel section outwardly so that it extends at right angles to the other panel section. The sections are releasably locked in this position by the engagement of a bifurcated clasp member carried on one panel with a lug carried by the cane rod member. When using the device in this position, one panel is rested in a vertical position upon the floor or ground, while the other panel extends in a generally horizontal plane to provide a shelf or support for one or both of the user's legs.

The device is unlocked from any of these positions by shifting the rod axially. This frees the cooperative latch element for disengagement; following which it is only necessary to pivot the panels to their new position and engage the appropriate latch elements. The rod is then released and the panel elements are locked in their new position.

One of the principal advantages of the present device is that while it incorporates all of the elements necessary to form a cane and a leg rest, it also can be folded into an extremely compact unit which can readily be carried about when the device is not in actual use.

A further advantage of the present device is that it can be firmly locked in each of its three functional positions. The reliability of the device is further increased by the fact that forces applied to the device in use, such as the weight of a person's hand or leg, tend to urge the elements toward their proper position, reinforcing the latches, rather than tending to cause the elements to shift to a different position.

A still further advantage of the present device is that it is readily changed from one position to another, even by a person seated in a confined area. The latching and unlatching of the unit in each of its three positions is effected by movement of a single member, i.e. the cane rod in the same direction. Consequently, the device can be set up and utilized with no difficulty even by persons of limited mechanical experience.

These and other objects and advantages of the present invention will be more readily apparent from the following detailed description of the drawings illustrating a preferred embodiment of the invention.

Brief description of the drawings

In the drawings:

FIGURE 1 is a front elevational view of the present convertible cane in its completely folded or "carrying" position.

FIGURE 2 is an end view of the cane in its folded position.

FIGURE 3 is a rear view of the cane in its folded position.

FIGURE 4 is a front view of the cane in its extended or "cane" position.

FIGURE 5 is an end view of the cane in its extended position.

FIGURE 6 is a rear view of the cane in its extended position.

FIGURE 7 is an end view of the cane in its "foot rest" position.

FIGURE 8 is a top view of the cane in its "foot rest" position.

FIGURE 9 is a bottom view of the cane in its "foot rest" position.

FIGURE 10 is a cross-sectional view taken along line 10—10 of FIGURE 7.

FIGURE 11 is a cross-sectional view taken along line 11—11 of FIGURE 10.

FIGURE 12 is a cross-sectional view taken along line 12—12 of FIGURE 3.

FIGURE 13 is an elevational view taken along line 13—13 of FIGURE 12.

FIGURE 14 is a cross-sectional view taken along line 14—14 of FIGURE 4.

FIGURE 15 is an elevational view taken along line 15—15 of FIGURE 14.

FIGURE 16 is a cross-sectional view taken along line 16—16 of FIGURE 6.

FIGURE 17 is a plan view taken along line 17—17 of FIGURE 18.

FIGURE 18 is a cross-sectional view taken along line 18—18 of FIGURE 6.

*Description of the preferred embodiment*

The overall construction of one preferred form of combined cane-leg rest 10 is best shown in FIGURES 1–9. As there shown, the device comprises two main panel sections, an upright panel section 11 and a shelf panel section 12. In addition to these panel sections the device includes a U-shaped arm 13 pivotally connected to each of the sections 11 and 12 and a reciprocable rod 14. Rod 14 functions both as the cane tip and as part of the latching mechanism for locking the device in each of its three functional positions. These functional positions are the "carrying" position shown in FIGURES 1–3, the "cane" position shown in FIGURES 4 and 5, and the "footrest" position shown in FIGURES 7–9.

More particularly, as is best shown in FIGURES 4 and 6, vertical panel section 11 includes a U-shaped frame member 15. This frame member can be formed of any suitable rigid material; for example, an aluminum or steel tubing. The U-shaped frame carries a flat panel 16 formed of any suitable rigid material, such as Masonite, metal, plastic or the like. The panel 16 is assembled with frame 15 in any suitable manner; for example, by means of bands 18, 19 and 20. In the embodiment shown, each of these bands includes loops 21 and 22 embracing one of the arms of frame member 15. The loops are joined to the panel 16 by means of bolts 23 which pass through aligned openings in the loops and panel member. Each of the two end bands 18 and 20 also carries a guide, or support bracket, 24 for slidably receiving elongated rod 14.

As shown in FIGURES 6 and 16, the lowermost bracket 24 also carries a transverse pin 25. This pin, which is held in the bracket in any suitable manner, such as by means of a press fit, extends through an elongated slot 26 in the rod 14. The length of slot 26 limits the longitudinal sliding movement of rod 14. As is shown in FIGURES 1 and 2, the ends of the arms of U-shaped frame member 15 extend downwardly below panel 16 to form two feet. These feet are preferably covered by rubber or plastic caps 27.

The details of construction of shelf panel section 12 are best shown in FIGURES 7, 8 and 9. As there shown, shelf panel section 12 includes a U-shaped frame member 28 formed of any suitable material, such as metal tubing like that used to form frame member 15. Shelf section 12 further comprises a rigid panel member 30 formed of Masonite or the like. As shown in FIGURES 1 and 3, the panel terminates short of the closed end of U-shaped frame member 28. This leaves a hand-carrying space indicated at 29 in FIGURE 3. The closed end of frame 15 can be covered with a rubber sleeve, or the like, to provide a better gripping surface if desired.

Panel member 30 is secured to frame member 28 by means of bands 31, 32 and 33. These bands are wrapped around the tubular frame 28 and bolted to the panel 30. The upper surface of shelf member 12 is preferably provided with a soft, padded covering, such as covering 34. This covering is secured to Masonite panel member 30 in any suitable manner.

The undersurface of shelf member 12 carries two sleeves, or bracket members, 47 secured to band 32. These sleeves 47 loosely receive U-shaped arm member 13, thereby pivotally interconnecting that arm to the shelf member 12. The undersurface of the shelf member also includes an angle bracket 35 which is bolted or otherwise secured to the panel member 30 and includes an outwardly extending arm 36 provided with a central aperture 37 (FIGURE 17) adapted to receive the tapered end of rod member 14. The arm 38 of angle bracket 35 abuts panel 30 and is provided with an elongated opening 39 adapted to receive a finger 46 carried by rod member 14 (FIGURE 12). A latch plate 81 is mounted on the opposite side of panel 30 from angle bracket 35. Latch plate 81 includes a finger-receiving opening 80 aligned with opening 39.

The inner end of panel 30 carries a bifurcated clamp assembly 40. The details of this clamp member are shown in FIGURES 10, 11, 14 and 15. More particularly, the clamp assembly 40 comprises a lower U-shaped member 41 and an upper U-shaped member 42 formed of sheet metal or the like. Each of these sheet metal members also includes two outwardly extending, parallel-spaced arms 43 and 44. Arms 43 are provided with opposed notches 92. The ends of arms 43 and 44 are preferably slightly curved as shown in Figures 11 and 14. The closed ends of the U-shaped members 41 and 42 are bolted, riveted or otherwise secured to the end of panel 30 with arms 43 and 44 extending outwardly from the end of the panel. Arms 43 of the upper U-shaped member and arms 44 of the lower U-shaped member are spaced apart by a U-shaped resilient pad 45 formed of plastic or the like.

The mounting of U-shaped arm 13 is best shown in FIGURES 1, 6 and 9. As there shown, U-shaped arm 13 is formed of any suitable material, such as aluminum tubing of the same type used to form frame members 15 and 28. As explained previously, the closed end of U-shaped arm 15 is pivotally connected to shelf panel 13 by means of sleeve bracket members 47. The ends of arm 50 of the U-shaped member are pivoted to bracket members 51 as by means of pins 52. Bracket members 51 are mounted in any suitable manner upon frame member 15. In the embodiment shown, these bracket members also carry a transverse band 49. This band supports two sleeve members 53 which carry a pin 54 (FIGURE 15) adapted to be engaged by clamp assembly 40.

The details of construction of rod member 14 are best shown in FIGURES 3 and 16. As there shown, rod member 14 is preferably formed of a hollow metal tube. One end of the rod member carries a rubber tip 55, while the opposite end of the rod members is tapered as indicated at 56. The rod member 14 is normally spring urged downwardly in FIGURE 1, and to the right in FIGURE 16, by means of an internal compression spring 57. Spring 57 is compressed between a plug 58, inserted in the rod in abutment with pin 25, and a second plug 60, mounted within the rod in abutment with a transverse pin 61. Rod 14 also carries an outwardly extending finger 46 having a rounded nose 63 and a transverse slot 64. Finger 46 extends normal to the plane of panel 16 and extends through an elongated slot 65 formed in that panel.

The first position of the device is its compact folded, or "package," position illustrated in FIGURES 1–3. In this position, the horizontal shelf 12 is folded upwardly into parallel relationship with main vertical panel 11. As is shown in FIGURES 1–3, the frame of the shelf panel extends upwardly above the frame of the main vertical panel and serves as a "carrying" member. The device is releasably held in this position by means of detent finger 46 carried by rod member 14. As is shown in FIGURE 12, this finger passes through an opening 65 in panel member 16. The end of the finger passes through an opening in panel 30 and opening 39 in angle bracket 35. The finger also passes through an opening 80 in latch plate 81 with the cross slot 64 of finger 45 snapping down over and embracing the lower edge of the latch plate opening. Finger 45 is spring urged downwardly due to the action of spring 47 which is urging rod 14 downwardly in FIGURES 1–3 and 12. In this folded position, the device is relatively compact and can be carried much like a briefcase or can be packed in a suitcase or the like.

In order to shift the device from the "carrying" position shown in FIGURES 1–3 to the "cane" position shown in FIGURES 4–6, the rod member 14 is raised slightly. This disengages finger 45 from latch plate 81 and frees the vertical panel unit 11 for outward and downward pivotal movement. This movement takes place about pins 52 which secure the vertical panel to the ends of the arms of U-shaped pivot member 13. The main vertical panel member is rotated until it is in a plane parallel to the plane of shelf panel 12. As is shown in FIGURES 4–6, the shelf panel is disposed above the vertical panel with the upper portion of frame member 28 functioning as a handle.

The rod 14 extends downwardly below the main vertical panel 11 with the rubber cap member 56 serving as a cane tip. The vertical panel and shelf panel are held in this position by the inner engagement of the tapered nose 56 of the rod 14 with apertures 37 in arm 36 of angle bracket 35. Also, as is shown in FIGURES 4, 14 and 15, the bifurcated clamp assembly 40 grips pin 54. Consequently, the various elements of the cane are firmly locked together.

It will be appreciated that rod 14 is normally spring urged upwardly and any pressure which is put upon that member merely tends to more tightly engage the tip of the cane member with apertures 37. Furthermore, arm 13 is offset (as shown in FIGURE 5) so that this arm exerts a torque on the panel sections 11 and 12, tending to maintain these sections erect, in their extended position.

In order to shift the device from the "cane" position shown in FIGURES 4–6 to the "rest" position shown in FIGURES 7–9, the rod 14 is pulled downwardly to disengage its tip from aperture 37. Shelf member 28 is then pivoted counterclockwise in FIGURE 5. This involves a double pivoting action since arm 13 is pivoted about pins 52 at the same time shelf 12 is pivoted relative to arm 13 about sleeve brackets 34. As the shelf approaches a position normal to that of vertical panel section 11 (which is inverted when the unit is used as a leg rest), the lower arms 44 of bifurcated clamp assembly 40 engage outwardly extending arm 96 or bracket 97 carried by panel 16 and arms 42 and 44 pass through an opening 90 in panel 16. The upper fingers 42 snap under transverse pin 61 carried by rod member 14. The engagement of this clamp member with the pin 61 rigidly holds the shelf and vertical member in their perpendicular relationship shown in FIGURES 7–9.

From the above disclosure of the general principles of the present invention and the preceding detailed description of a preferred embodiment, those skilled in the art will readily comprehend various modifications to which the invention is susceptible. Therefore, I desire to be limited only by the scope of the following claims.

Having described my invention, I claim:

1. A combined cane and leg rest device comprising a vertical panel section, a shelf panel section, one of said panel sections having a handle portion on one end thereof, an interconnecting member pivotally secured to each of said panel sections intermediate the ends thereof, an elongated rod member, means mounting said rod member on one panel for limited reciprocating movement relative thereof, said rod member extending beyond said last named panel to form a cane tip, releasable latch means controlled by said rod for selectively securing said two panel sections in each of three positions: a "carrying" position in which said panels are folded to substantially overlap one another with said handle portion being exposed, an extended "cane" position in which said panels extend parallel to one another, said handle being disposed uppermost, and a "leg rest" position in which one of said panels extends substantially perpendicular to the other of said panels.

2. The device of claim 1 in which the latch means securing the device in a "carrying" position comprises a detent finger extending outwardly transversely of said rod, and a latch plate carried by one of said panel sections and having an opening therein for reception of said finger, the other of said panel sections having an opening aligned therein with said latch plate opening, said finger passing through said opening in said panel and engaging said latch plate.

3. The device of claim 1 in which the latch means operable to secure the device in its extended "cane" position comprises a bracket secured to one of said panel sections, and having an outwardly extending arm with an aperture therein, said rod having a tip disposed within said aperture, a clamp assembly comprising two spaced plates each having parallel arms formed therein, said clamp assembly being mounted on the end of one of said panel members, a transverse rod carried by the other of said panel members, said arms of said clamp assembly embracing said rod.

4. The device of claim 1 in which the latch means for holding said device in said "leg rest" position comprises a clamp assembly comprising two spaced plates each having parallel arms, the arms of one of said plates having spaced notch portions formed therein, said clamp assembly being carried on the end of one of said panel members, the other of said panel members having an aligned opening formed therein for receiving said clamp assembly, and a transverse pin carried by said rod and being disposed in said notch portions.

5. The device of claim 4 further comprising an angle bracket disposed beneath and adjacent to said opening for engagement with the arms of said clamp assembly to align said clamp assembly with the opening in said panel section.

6. A combined cane and leg rest device comprising a vertical panel section, a shelf panel section, one of said panel sections having a handle portion formed on the end thereof, a U-shaped member having two arms and a closed section, said arms being pivotally secured to one of said panel sections intermediate the ends thereof, the closed section being pivotally secured to the other panel section, an elongated rod member, means mounting said rod member on one panel for limited reciprocating movement relative thereof, spring means biasing said rod in one direction, releasable latch means controlled by said rod for selectively securing said two panel sections in each of three positions: a "carrying" position position in which said panels are folded to substantially overlap one another with said handle portion being exposed, an extended "cane" position in which said panels extend parallel to one another, said handle being disposed uppermost, and a "leg rest" position in which one of said panels extends substantially perpendicular to the other of said panels.

7. The device of claim 6 in which the latch means securing the device in a "carrying" position comprises a detent finger extending outwardly transversely of said rod, and a latch plate carried by one of said panel sections and having an opening therein for reception of said finger, the other of said panel sections having an opening aligned therein with said latch plate opening, said finger passing through said opening in said panel and engaging said latch plate.

8. The device of claim 6 in which the latch means operable to secure the device in its extended "cane" position comprises a bracket secured to one of said panel sections, and having an outwardly extending arm with an aperture therein, said rod having a tip disposed within said aperture, a clamp assembly comprising two spaced plates each having parallel arms formed therein, said clamp assembly being mounted on the end of one of said panel members, a transverse rod carried by the other of said panel members, said arms of said clamp assembly embracing said rod.

9. The device of claim 6 in which the latch means for holding said device in said "leg rest" position comprises a clamp assembly comprising two spaced plates each having parallel arms, the arms of one of said plates having spaced notch portions formed therein, said clamp assembly being carried on the end of one of said panel members, the other of said panel members having an aligned opening formed therein for receiving said clamp assembly, and a transverse pin carried by said rod and being disposed in said notch portions.

10. The device of claim 9 further comprising an angle bracket disposed beneath and adjacent to said opening for engagement with the arms of said clamp assembly to align said clamp assembly with the opening in said panel section.

References Cited

UNITED STATES PATENTS

| | | | |
|---|---|---|---|
| 595,637 | 12/1897 | Kuhnke | 135—49 |
| 751,942 | 2/1904 | Renno | 135—49 |
| 1,463,675 | 7/1923 | Coleman | 135—49 |
| 1,521,536 | 12/1924 | Holmes | 135—49 |

PETER M. CAUN, *Primary Examiner.*

U.S. Cl. X.R.

135—49